(12) United States Patent
Bantle

(10) Patent No.: US 6,406,235 B1
(45) Date of Patent: Jun. 18, 2002

(54) MOUNTING ELEMENT

(75) Inventor: Ulrich Bantle, Empfingen (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 0 days.

(21) Appl. No.: 09/541,772

(22) Filed: Apr. 3, 2000

(30) Foreign Application Priority Data

Apr. 1, 1999 (DE) .......................................... 199 15 119
Oct. 21, 1999 (DE) .......................................... 199 50 745

(51) Int. Cl.⁷ ................................................ F16B 13/06
(52) U.S. Cl. .......................................... 411/45; 411/41
(58) Field of Search ............................... 411/41, 45–48, 411/57.1, 58, 60.1, 60.3, 72, 182, 183; 403/280, 282, 374.1, 374.3

(56) References Cited

U.S. PATENT DOCUMENTS

| | | | | |
|---|---|---|---|---|
| 2,542,144 A | * | 2/1951 | Kearns | |
| 3,765,295 A | * | 10/1973 | Ptak | |
| 4,405,272 A | * | 9/1983 | Wollar | |
| 4,821,381 A | * | 4/1989 | Kaneko | |
| 5,217,337 A | * | 6/1993 | Junemann | |
| 5,568,675 A | * | 10/1996 | Asami | |
| 5,945,606 A | * | 8/1999 | Tokunaga | |

* cited by examiner

*Primary Examiner*—Flemming Saether
(74) *Attorney, Agent, or Firm*—Pauley Petersen Kinne & Erickson

(57) ABSTRACT

A mounting element with a connecting pin and a fastening sleeve, wherein the fastening sleeve can be fixed in place in a bore of a workpiece. So that the mounting element can be dependably and securely mounted, the connecting pin is held in a pre-plug-in position in a receptacle of the fastening sleeve. The connecting pin has a detent which, in the pre-plug-in position, rests against a shoulder of the fastening sleeve, and rests against the fastening sleeve in the direction of the insertion movement of the connecting pin into the fastening sleeve. The connecting pin and/or the fastening sleeve has a triggering device, by which the connection between the connecting pin and the fastening sleeve can be released.

16 Claims, 4 Drawing Sheets

MOUNTING ELEMENT

BACKGROUND OF THE INVENTION

1. Field of the Invention

This invention relates to a mounting element with a connecting pin and a fastening sleeve, wherein the fastening sleeve can be fixed in a bore of a workpiece.

2. Description of Related Art

Varied mounting elements are known from the prior art. For example, connecting elements for connecting portions of furniture, or for applying fitting elements to a piece of furniture, are required in building furniture. Here, the bore in the piece of furniture is often made in the form of a blind bore, and the mounting element is in two pieces. One part of the mounting element is inserted into the blind bore. A dowel is customarily used as the fastening sleeve. A connecting pin can then be inserted into the fastening sleeve for connecting a component.

SUMMARY OF THE INVENTION

It is one object of this invention to provide a mounting element which can be mounted simply and dependably.

This object is attained with a connecting pin maintained in a pre-plug-in position in a receptacle of a fastening sleeve. A connecting pin has a detent which, in the pre-plug-in position, rests against a shoulder of the fastening sleeve, and rests against the fastening sleeve in an interlocking manner in the direction of the insertion movement of the connecting pin into the fastening sleeve. The connecting pin and/or the fastening sleeve has a triggering device, by which a connection between the connecting pin and the fastening sleeve can be released.

The mounting elements are used in a pre-assembled position. The connection between the fastening sleeve and the connecting pin, which is achieved by the shoulder and the detent, prevents the connecting pin from being inadvertently pushed into the fastening sleeve. The displacement of the connecting pin in relation to the fastening sleeve only becomes possible when the triggering device is actuacted.

The detent of the connecting pin is preferably held interlockingly on the shoulder of the fastening sleeve.

In one embodiment of this invention, the fastening sleeve has at least two separated holding legs in the area of its free end facing away from the pre-plugged-in connecting pin, which are spread apart in the pre-plug-in position. The holding legs have an inclined abutting face in the area of their free ends. When the fastening sleeve is fitted into the bore of the workpiece, the inclined abutting faces slide up, for example at the bore entry, because the holding legs are moved toward each other. This displacement of the holding legs can then be used for releasing the connection between the detent of the connecting pin and the shoulder of the fastening sleeve.

The holding legs can be pivoted out of their pre-plug-in position around virtual centers of rotation into a placement position, wherein the connection between the fastening sleeve and the connecting pin is cancelled in the placement position.

If the fastening sleeve has a clamping element, which clamps the shoulder of the fastening sleeve against the detent of the connecting pin, there is an additional security against an unintentional release of the connection between the connecting pin and the fastening sleeve.

In this case the mounting element can have such a form, that the fastening sleeve is provided, at least partially, with a longitudinal slit bridged by the clamping element. The clamping element can be stretched or displaced transversely with respect to the longitudinal extension of the longitudinal slit. Here, the clamping element can be connected in one piece with the fastening sleeve, for example by direct injection molding.

In one preferred embodiment of this invention, the interconnection between the connecting pin and the fastening sleeve released, the shoulder of the connecting pin and detent of the fastening sleeve, the connecting pin is held on a shaped surface of the fastening sleeve. A holding force generated on the shaped surface is greater than the joining force required for inserting the fastening sleeve into the bore of the workpiece. This step assures that the connecting pin cannot be pushed into the fastening sleeve before it is completely inserted into the bore of the workpiece.

For reasons of a simplification of manufacturing, the connecting pin can for example be formed in one piece on a fastening element which is to be connected with the workpiece. In this way a unit is created which can be connected with the workpiece in an automated manner.

In one mounting element in accordance with this invention, in its end area facing the fastening element the fastening sleeve has a spring element, which is clamped against a contact face of the fastening element in the axial direction of the pushed-in connecting pin. The spring element compensates for possible play occurring between the connecting pin and the fastening sleeve.

Clamping of the connecting pin so it is free of shaking becomes possible if the fastening sleeve has a fitting collar with an exterior diameter that exceeds an interior diameter of the bore. The fastening sleeve can be deformed radially inward at the bore in the area of its fitting collar, and the connecting pin can be pushed into the receptacle of the fastening sleeve and clampingly held in the area of the fitting collar because of the deformation of the fastening sleeve.

BRIEF DESCRIPTION OF THE DRAWINGS

This invention will be explained in greater detail in what follows by embodiments represented in the drawings wherein.

DESCRIPTION OF PREFERRED EMBODIMENTS

Figure 1:
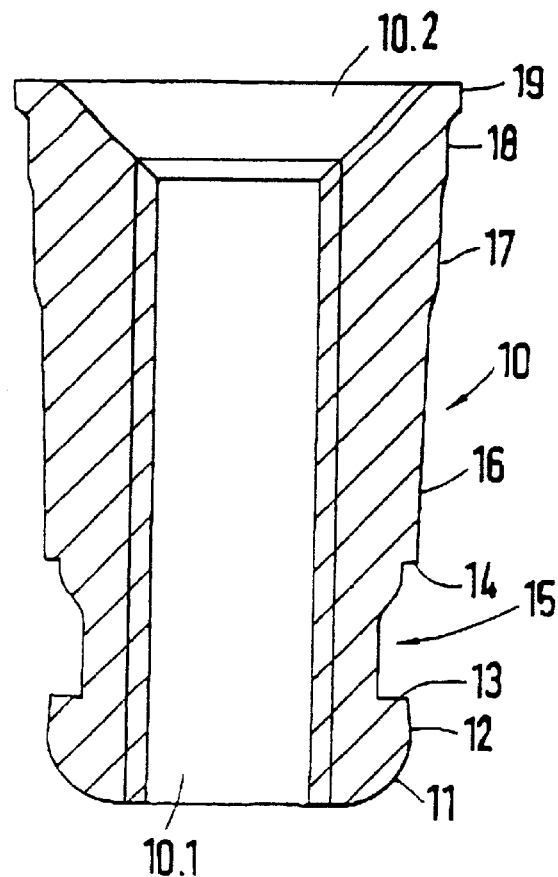
FIG. 1 shows connecting pin in a side view and in section.

A connecting pin 10 is represented in FIG. 1, which can be produced as a dynamically balanced component, for example as an injection-molded element. A centered fastening receptacle 10.1 extends through the connecting pin 10, which can be embodied as a screw thread. However, the fastening receptacle 10.1 can also be a bore, into which a thread-forming or a tapping screw can be rotated. The fastening receptacle 10.1 terminates in a conical widening 10.2. This permits a simplified insertion of the screw into the fastening receptacle 10.1. The widening 10.2 can simultaneously be used for receiving the countersunk head of a fastening screw. This is necessary, for example, if a thin sheet metal plate is screwed together with the connecting pin, where the thickness of the sheet metal is not sufficient for receiving the countersunk head. In the end area facing the widening 10.2, the connecting pin 10 has a cylindrical end piece 19, which transitions into a circumferential collar 18. The collar 18 is designed with a reduced diameter with respect to the end piece 19, so it forms a shoulder. A step 17, also of a reduced diameter, adjoins the collar 18. The step 17 transitions into a sliding surface 16. On its end facing away from the widening 10.2, the sliding surface 16 terminates in a detent groove 15. The detent groove 15 has a detent 14, which is directly connected to the sliding surface 16. The contact surface constituted by the detent 14 is at right angles, or almost at right angles, with the sliding surface 16. A steep detent flank 13 is on the side of the detent groove 15 located opposite the detent 14. Adjoining the detent flank 13, the connecting pin 10 has a cylindrical or slightly conical support 12 that transitions into an inclined deflection surface 11. The inclined deflection surface 11 forms an end of the connecting pin 10.

Figure 2:
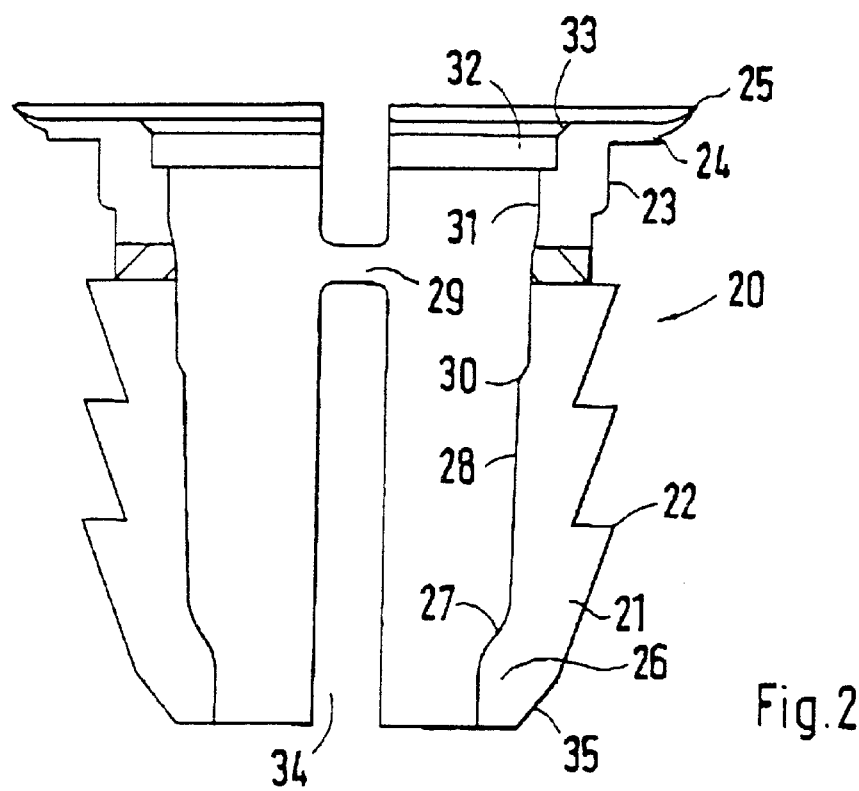
FIG. 2 shows fastening sleeve in a side view.

The connecting pin 10 can be inserted into a fastening sleeve 20, which is shown in detail in FIG. 2. The fastening sleeve 20, the same as the connecting pin 10, can be made of a plastic material, for example an injection-molded element.

The fastening sleeve 20 in accordance with FIG. 2 has a longitudinal slit 34 extending in the longitudinal direction. This longitudinal slit 34 extends over an entire height of the fastening sleeve 20, and only a partial area of it is bridged by means of a clamping element 29. The clamping element 29 is ribbon-like and is attached in one piece to the fastening sleeve 20 by direct injection molding. Besides the longitudinal slit 34, the fastening sleeve 20 has at least one additional longitudinal slit, so that holding springs 21 are divided off the fastening sleeve 20. On their exterior, the holding springs 21 have a tooth arrangement 22. At the end of the fastening sleeve 20, shown on the bottom in FIG. 2, the tooth arrangement 22 terminates in an inclined abutting face 35, which is inclined with respect to the center longitudinal axis of the fastening sleeve 20. A fitting collar 23 is provided on the upper end of the fastening sleeve 20. In accordance with the division as a result of the longitudinal slits 34, the fitting collar 23 extends in a segment-like annular shape around the center longitudinal axis of the fastening sleeve 20. A support flange 24 adjoins the fitting collar 23. This support flange 24 has an increased diameter in comparison with the fitting collar 23. A spring element 25 adjoins the support flange 24 at a free end of the fastening sleeve 20. The spring element 25 extends past the support flange 24 and extends, the same as the fitting collar 23 and the center longitudinal axis of the fastening sleeve 20.

The fastening sleeve 20 encloses a receptacle, into which the connecting pin 10 can be inserted, which will be explained in greater detail later. The receptacle is essentially formed by the holding springs 21. Detent elements 26 are formed in the area of the free ends of the holding springs 21. Facing the receptacle of the fastening sleeve 20, the detent elements 26 transition into a flank 27, which is inclined with respect to the center longitudinal axis of the fastening sleeve 20. An inner wall 28 adjoins the flank 27 and transitions via a shaped surface 30 into a pressure surface 31 of increased diameter. The pressure surface 31 makes a transition into a shoulder 32. An abrupt transition is formed between the pressure surface 31 and the shoulder 32.

The shoulder 32 terminates in a widening 33, used as an insertion aid for the connecting pin 10.

For assembling the mounting element, the connecting pin 10 is inserted into the fastening sleeve 20. In the process, the inclined deflection surface 11 slides on the widening 33 and the shoulder 32. Because of the geometric conditions, the clear width of the longitudinal slit 34 is then widened in the area of the inclined abutting face 35. The clear width of the longitudinal slit 34 accordingly increases in the area of the support flange 34. If the connecting pin 10 is pushed farther into the fastening sleeve 20, the clamping element 29 is stretched transversely with respect to the longitudinal extension of the fastening sleeve 20. In this case, the stretching takes place at least partially in a spring-elastic manner. When the clamping element 29 reaches the area of the detent groove 15, the spring-elasticity has such an effect, that the holding legs 21 are spread apart in the area of the inclined abutting face 35 of the fastening sleeve 20. The fastening sleeve 20 accordingly flips radially inward in the area of the support flange 24, so that the shoulder 32 of the fastening sleeve 20 is pushed into the detent groove 15. When the connecting pin 20 is moved farther, the shoulder 32 slides over the inclined surfaces of the detent groove 15 against the detent 14. Together with the shoulder 32, the detent 14 prevents further insertion movement of the connecting pin 10 into the fastening sleeve 20. A pre-plug-in position is thus achieved. The clamping element 29 clamps the shoulder 32 against the detent 14 because of its spring-elastic design in the pre-plug-in position. It is thus assured that the holding legs 21 cannot be inadvertently moved toward each other which, in the end, would release the interlocking connecting formed by the shoulder 32 and the detent 14.

Figure 3:
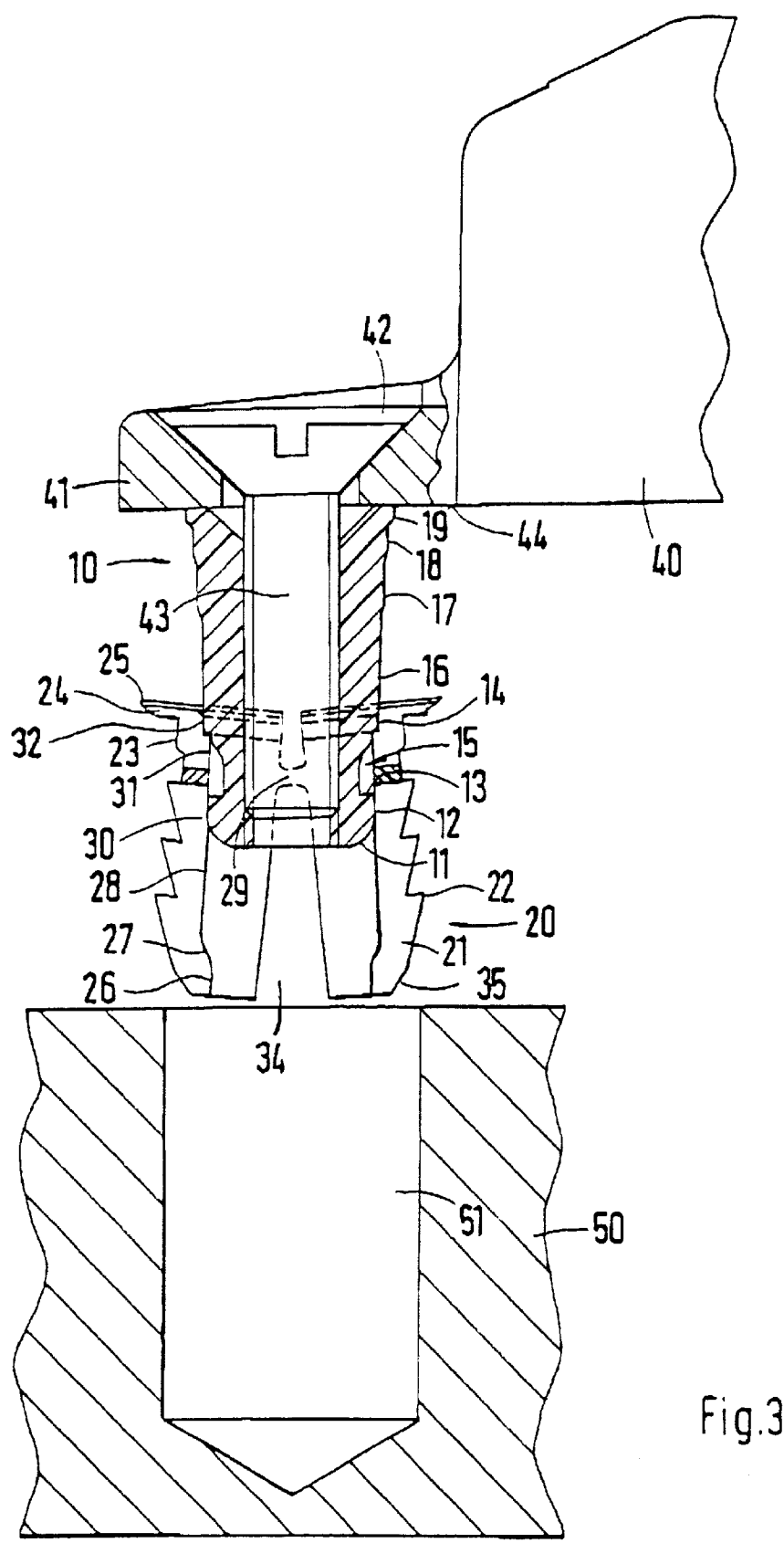
FIG. 3 shows a unit, having a fastening sleeve, a connecting pin and a fitting element for being mounted on a workpiece, in side view and in section.

As FIG. 3 shows, a fitting element 40, for example a furniture fitting element, is fastened on the connecting pin 10. The fitting element 40 has a protruding flange 41, through which a bore 42 extends. A fastening screw 43 can be inserted into the bore 42 and screwed into the fastening receiver 10.1 of the connecting pin 10. In the process, the fastening screw 43 fixes the fastening element 40 against the connecting pin 10 so that a lower contact face of the flange 41 rests on the facing end face of the end piece 19 of the connecting pin 10.

The unit comprising the fitting element 40 with the connecting pin 10 and the fastening sleeve 20 can be fastened on a workpiece 50. The workpiece 50 has a bore, in this case a blind bore 51. To mount the fitting element 40, the fastening sleeve 20 is inserted into the blind bore 51. In the process, the inclined abutting faces 35 of the fastening sleeve 20 first slide on the bore step of the blind bore 51. In the course of sliding of the inclined abutting faces 35, the holding legs 27 are deflected radially inward. Because of this deflection, the interlocking connection between the shoulder 32 and the detent 14 and between the connecting pin 10 and the fastening sleeve 20 is released.

Figure 4:
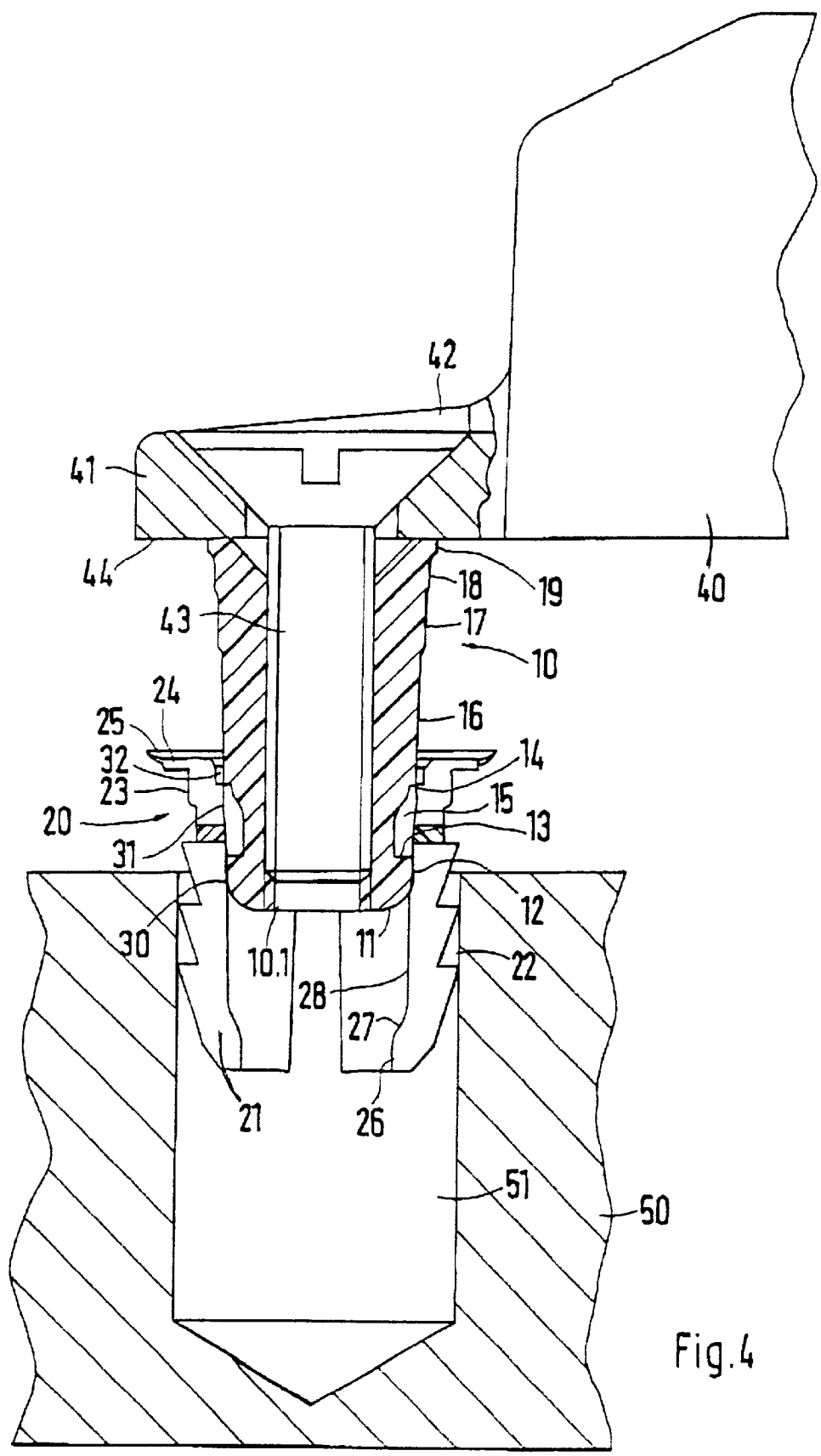
FIG. 4 shows the unit in accordance with FIG. 3, but in a partially mounted state.

As FIG. 4 shows, the connecting pin 20 can be inserted into the blind bore 51, wherein the tooth arrangement 22 of the fastening sleeve 20 passes along the inner wall of the blind bore 51. The joining force required for this is introduced through the fastening element 40, for example. To prevent the connecting pin 10 from being inserted into the fastening sleeve 20 before the fastening sleeve 20 is completely inserted into the blind bore 51, the connecting pin 10 is held by the inclined deflection surface 11 on the inclined shaped surface 30 of the fastening pin 20. Here, the holding force generated at the shaped surface 30 is greater than the joining force required for joining the fastening sleeve 20 with the blind bore 51. If the fastening sleeve 20 is completely inserted into the blind bore 51, the support flange 24 in the area around the bore entry of the blind bore 51 rests on the top of the workpiece 50. It is now possible to increase the joining force, so that the connecting pin 10 is pushed over the shaped surface 30. While inserting the connecting pin, the holding legs 21 are spread radially outward. This is accomplished by the sliding surface 16 running up on the inner wall 28 of the fastening sleeve 20. In the process, the tooth arrangement 22 can penetrate a further distance into the surface of the inner wall of the blind bore 51 and can dig in a barb-like manner. Once the inclined deflection surface 11 of the connecting pin 10 is moved past the inner wall 28 of the fastening sleeve 20, it engages with the flank 27. Then, in the area of their free ends, the holding legs 21 are pivoted outward around a virtual center of rotation. In this case the virtual center of rotation is arranged approximately at the height of the first tooth of the tooth arrangement 22. After the exterior support 12 of the connecting pin 10 passes the detent elements 26 of the holding legs 21, the detent elements 26 snap into the detent groove 15. Simultaneously, the front faces of the holding legs 21, which extend at approximately right angles to the center longitudinal axis of the fastening sleeve 20, rest against the steep detent flanks 13 of the connecting pin 10. Thus the connecting pin 10 cannot be pulled out of the fastening sleeve 20, because of which a solid connection of the fitting element 40 to the workpiece 50 becomes possible.

Figure 5:
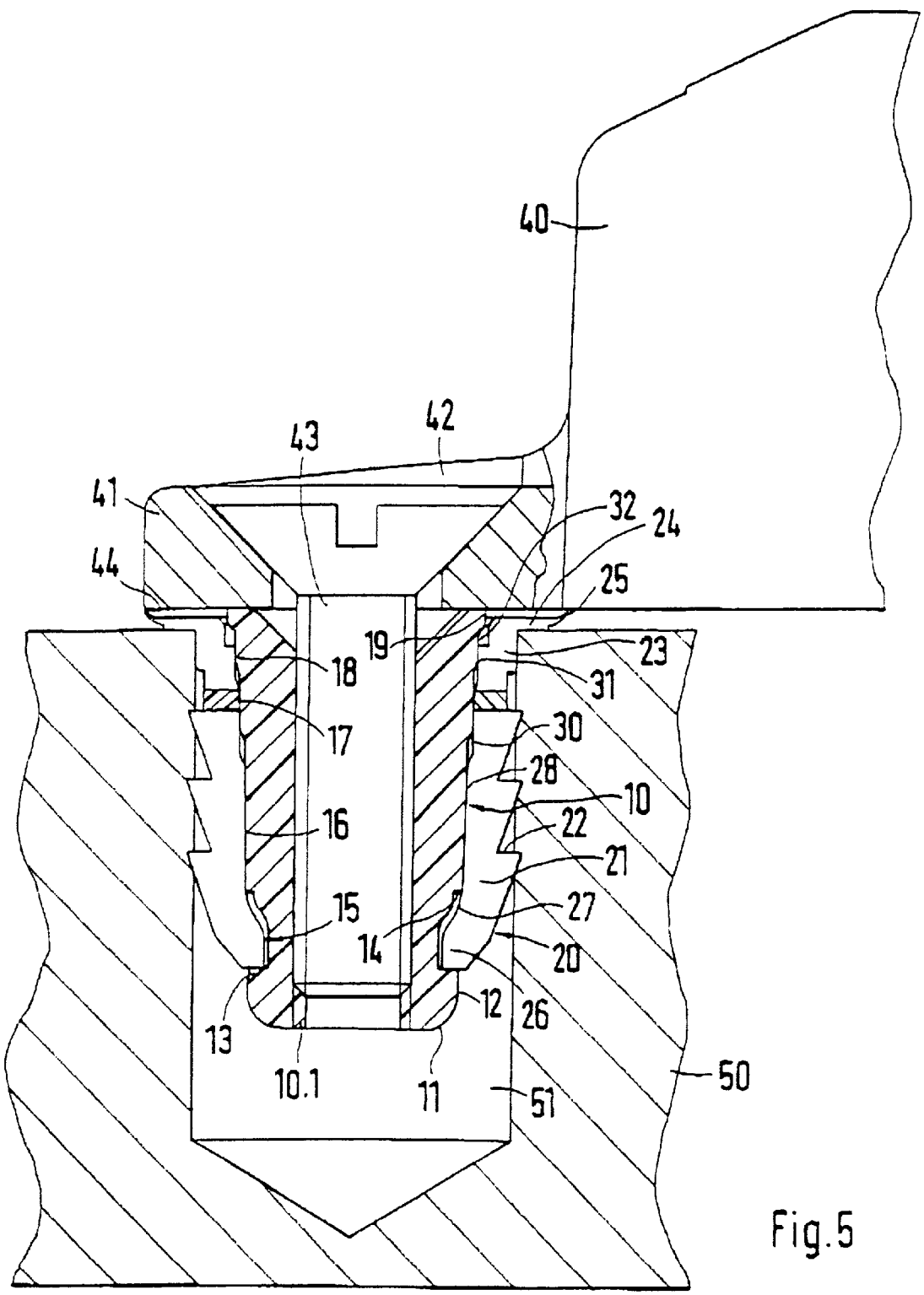
FIG. 5 shows the unit in accordance with FIG. 3, but in a completely mounted state.

To compensate any possible play occurring in the area of the detent groove 15 between the connecting pin 10 and the fastening sleeve 20, the spring element 25 is placed against the contact surface 44 of the fastening element 40. Thus the fastening element 40 is clamped against the workpiece 50 in the axial direction of the connecting pin 10. The details of the final mounting position of the mounting element can be taken from FIG. 5.

In the area of its fitting collar 23, the fastening sleeve 20 has an exterior diameter which is selected to be slightly larger than the interior diameter of the blind bore 51. For example, the blind bore 51 can have a diameter size of 8 mm, the fitting collar 23 a diameter size of 8.1 to 8.2 mm. Because of this arrangement of the measurements, the fitting collar 23 is deformed radially inward when the fastening sleeve 20 is joined. This radial deformation causes the fitting collar 23 to be pressed against the collar 18 of the connecting pin 10. Clamping of the connecting pin 10, free of shaking, is accomplished by means of this pressure connection.

It has been shown that the length of the detent element 26 in the direction of the center longitudinal axis of the connecting pin 10 in one embodiment must be at least 0.2 to 1 mm, depending on the plastic material used, so that a sufficient shearing resistance is assured.

What is claimed is:

1. In a mounting element having a connecting pin and a fastening sleeve, wherein the fastening sleeve can be fixed in place in a bore of a workpiece, the improvement comprising:

the connecting pin (10) held in a pre-plug-in position in a receptacle of the fastening sleeve (20), the connecting pin (10) having a detent (14), in the pre-plug-in position the detent (14) resting against a shoulder (32) of the fastening sleeve (20), and resting against the fastening sleeve (20) in a direction of an insertion movement of the connecting pin (10) into the fastening sleeve (20), at least one of the connecting pin (10) and the fastening sleeve (20) having a triggering device for releasing a connection between the connecting pin (10) and the fastening sleeve (20), the fastening sleeve (20) having at least two separated holding legs (21) in an area of a free end facing away from the connecting pin (10) in the pre-plug-in position which are spread apart in the pre-plug-in position, the holding legs (21) having an inclined abutting face (35) in an area of free ends of the holding legs (21), and upon entry of the fastening sleeve (20) into the bore of the workpiece the holding legs (21) each pivoting out of the pre-plug-in position around a virtual center of rotation into a placement position and releasing the connection between the fastening sleeve (20) and the connecting pin (10).

2. In the mounting element in accordance with claim 1, wherein the detent (14) is held interlockingly on the shoulder (32).

3. In the mounting element in accordance with claim 1, wherein the fastening sleeve (20) has a clamping element (29) which clamps the shoulder (32) of the fastening sleeve (20) against the detent (14) of the connecting pin (10).

4. In the mounting element in accordance with claim 3, wherein the fastening sleeve (20) at least partially has a longitudinal slit (34), bridged by the clamping element (29), and the clamping element (29) is displaceable transversely with respect to a longitudinal extension of the longitudinal slit (34).

5. In the mounting element in accordance with claim 4, wherein the fastening sleeve (20) is embodied as an injection molded element and is formed in one piece with the clamping element (29).

6. In the mounting element in accordance with claim 5, wherein with the connecting pin (10) released from the fastening sleeve (20) the connecting pin (10) is held on a shaped surface (30) of the fastening sleeve (20), and a holding force generated on the shaped surface (30) is greater than a joining force required for inserting the fastening sleeve (20) into the bore (51) of the workpiece (50).

7. In the mounting element in accordance with claim 6, wherein the connecting pin (10) is formed in one piece on a fastening element (40) connectible with the workpiece (50).

8. In the mounting element in accordance with claim 7, wherein in an end area facing the fastening element (40) the fastening sleeve (20) has a spring element (25) clamped against a contact face (44) of the fastening element (40) in an axial direction of the connecting pin (10).

9. In the mounting element in accordance with claim 8, wherein the fastening sleeve (20) has a fitting collar (23) with an exterior diameter that exceeds an interior diameter of the bore (51), the fastening sleeve (20) is deformed radially inward at the bore (51) near a fitting collar (23) of the fastening sleeve (20), and the connecting pin (10) pushed into the receptacle of the fastening sleeve (20) is clampingly held near the fitting collar (23) by a deformation of the fastening sleeve (20).

10. In the mounting element in accordance with claim 1, wherein the fastening sleeve (20) has a clamping element (29) which clamps the shoulder (32) of the fastening sleeve (20) against the detent (14) of the connecting pin (10).

11. In the mounting element in accordance with claim 10, wherein the fastening sleeve (20) at least partially has a longitudinal slit (34) bridged by the clamping element (29), and the clamping element (29) is displaceable transversely with respect to a longitudinal extension of the longitudinal slit (34).

12. In the mounting element in accordance with claim 1, wherein the fastening sleeve (20) is embodied as an injection molded element and is formed in one piece with the clamping element (29).

13. In the mounting element in accordance with claim 1, wherein with the connecting pin (10) released from the fastening sleeve (20) the connecting pin (10) is held on a shaped surface (30) of the fastening sleeve (20), and a holding force generated on the shaped surface (30) is greater than a joining force required for inserting the fastening sleeve (20) into the bore (51) of the workpiece (50).

14. In the mounting element in accordance with claim 1, wherein the connecting pin (10) is formed in one piece on a fastening element (40) connectible with the workpiece (50).

15. In the mounting element in accordance with claim 1, wherein in an end area facing the fastening element (40) the fastening sleeve (20) has a spring element (25) clamped against a contact face (44) of the fastening element (40) in an axial direction of the connecting pin (10).

16. In the mounting element in accordance with claim 1, wherein the fastening sleeve (20) has a fitting collar (23) with an exterior diameter that exceeds an interior diameter of the bore (51), the fastening sleeve (20) is deformed radially inward at the bore (51) near a fitting collar (23) of the fastening sleeve (20), and the connecting pin (10) pushed into the receptacle of the fastening sleeve (20) is clampingly held near the fitting collar (23) by a deformation of the fastening sleeve (20).

* * * * *